United States Patent [19]

Goloff et al.

[11] 4,293,050

[45] Oct. 6, 1981

[54] TRANSMISSION-DIFFERENTIAL COMBINATION

[75] Inventors: Alexander Goloff, East Peoria; Ralph E. Denning, Washington, both of Ill.

[73] Assignee: Caterpillar Tractor Co., Peoria, Ill.

[21] Appl. No.: 881,218

[22] Filed: Feb. 27, 1978

[51] Int. Cl.³ .......................................... B62D 11/12
[52] U.S. Cl. .................................. 180/6.26; 74/191; 74/194; 74/721; 180/6.66
[58] Field of Search ................... 180/6.24, 6.26, 6.28, 180/6.3, 6.66, 6.48; 74/721, 720.5, 191, 192, 193, 201, 194

[56] References Cited

U.S. PATENT DOCUMENTS

| 1,401,221 | 12/1921 | White | 74/720.5 X |
| 3,191,704 | 6/1965 | Shelton | 180/6.26 |
| 3,299,744 | 1/1967 | Kraus | 74/721 X |
| 3,448,818 | 6/1969 | Davis | 180/6.66 |
| 3,850,258 | 11/1974 | Bauer | 180/6.48 |
| 4,152,946 | 5/1979 | Kemper | 74/193 |

FOREIGN PATENT DOCUMENTS

| 557530 | 5/1958 | Canada | 180/6.24 |
| Ad.19029 | 7/1896 | United Kingdom | 180/6.26 |

Primary Examiner—John A. Pekar
Attorney, Agent, or Firm—Wegner, Stellman, McCord, Wiles & Wood

[57] ABSTRACT

A rotating drive wheel which drives a pair of output shafts. The driving of each of the output shafts proceeds via a mechanical transmission which delivers rotary motion from the drive wheel to the output shafts. A drive ratio delivered by each of the transmissions can be selectively varied.

11 Claims, 8 Drawing Figures

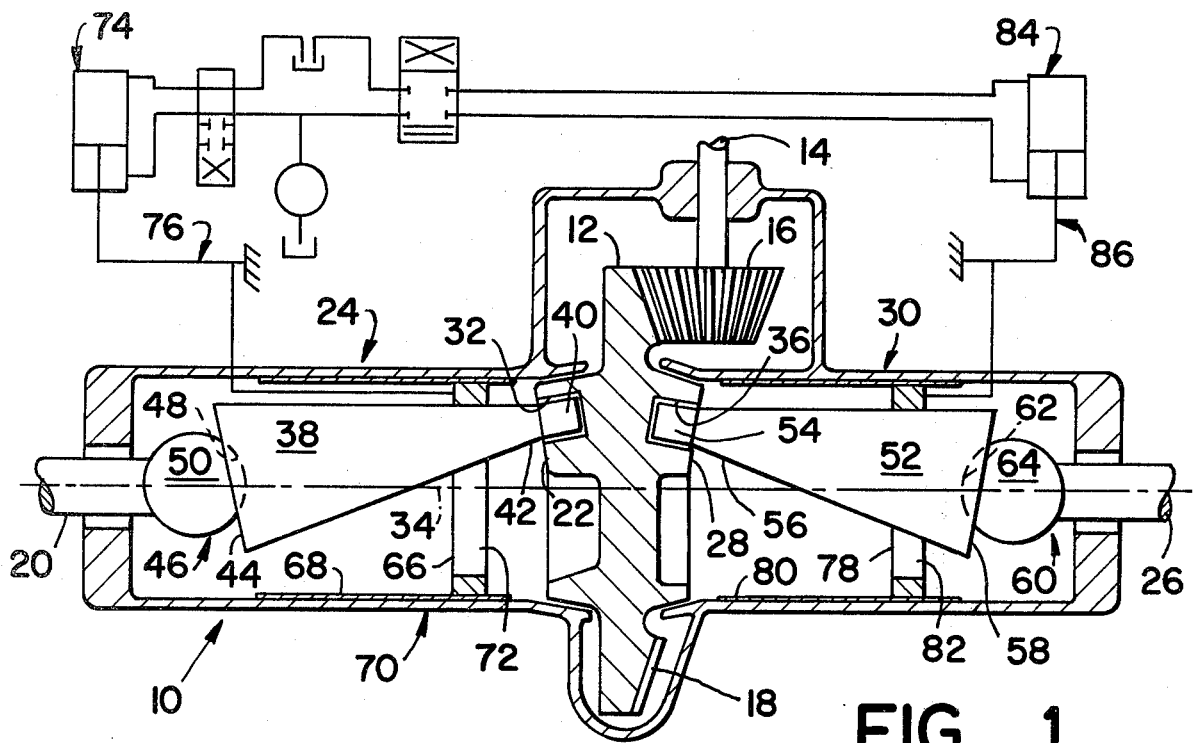
FIG_1
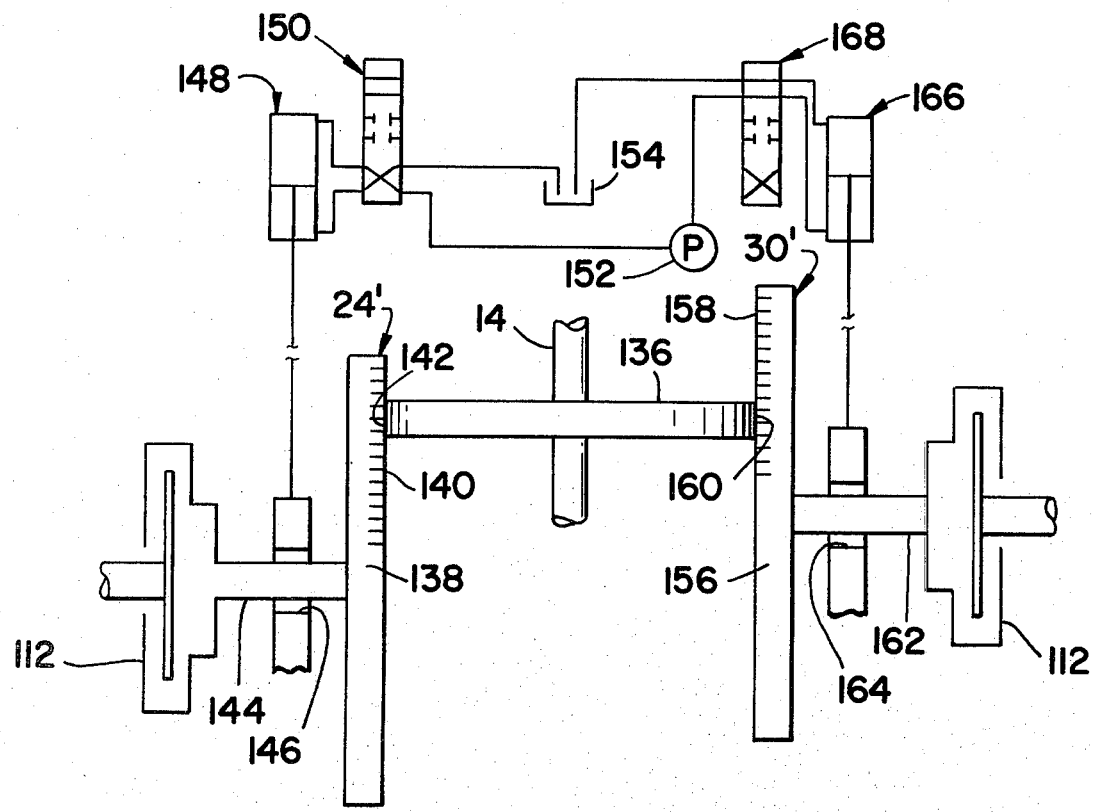
FIG_7

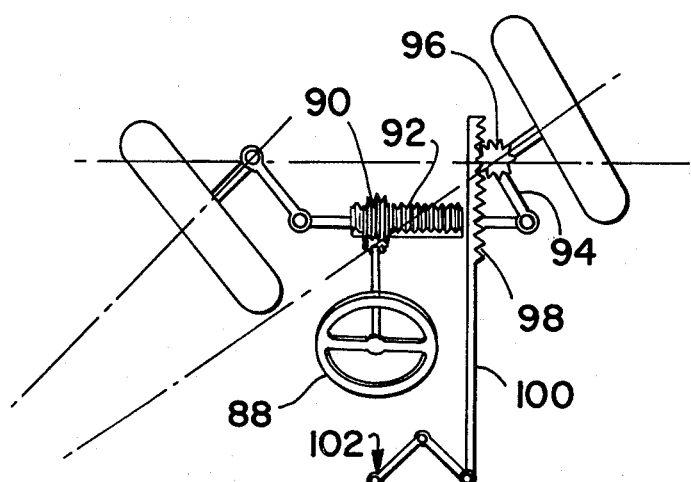
FIG_2
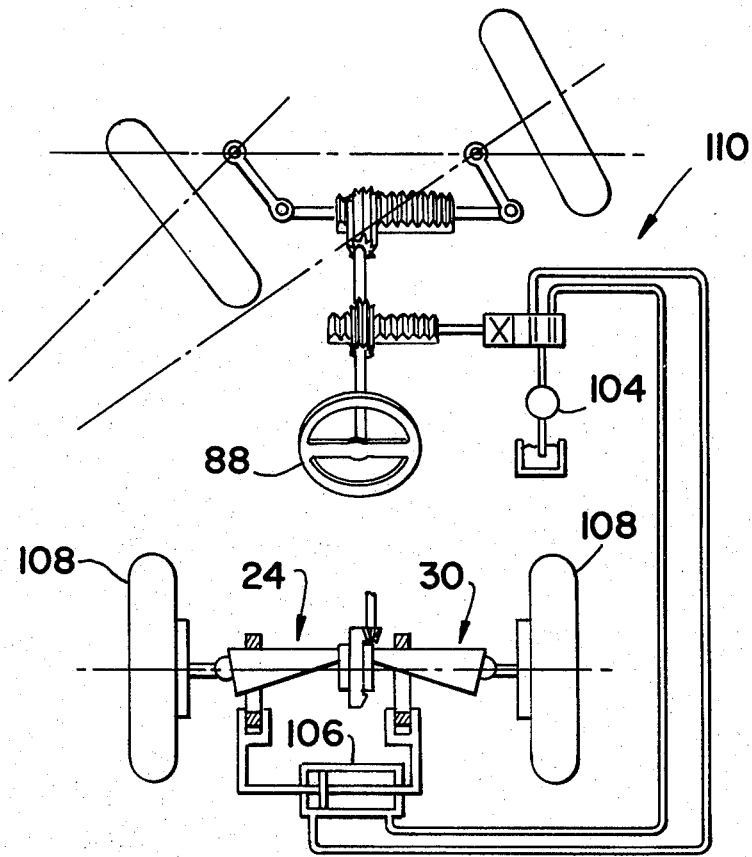
FIG_3

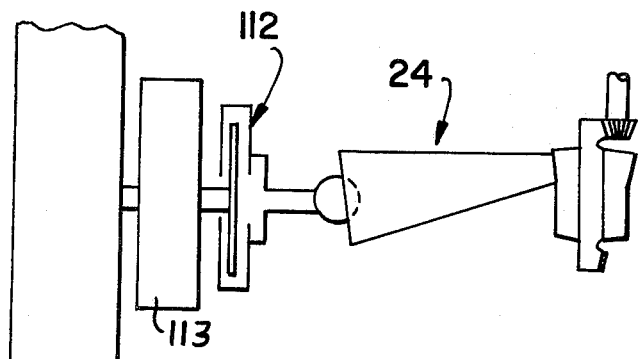
FIG_4
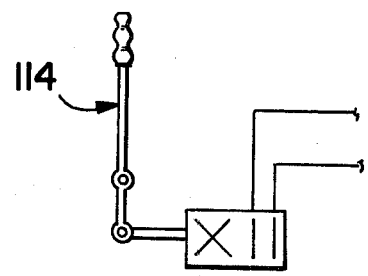
FIG_5a
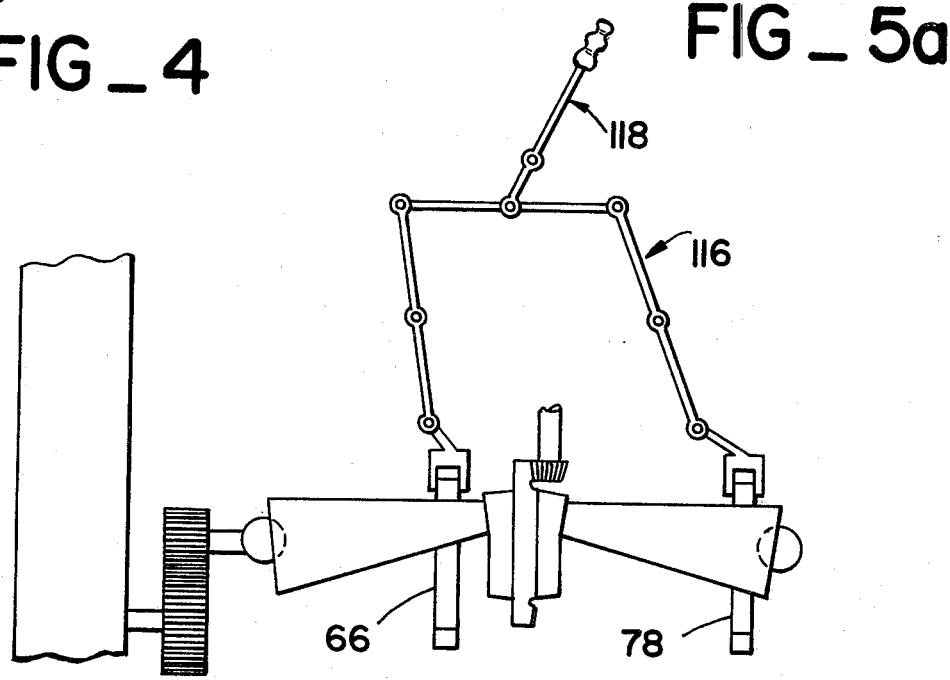
FIG_5b
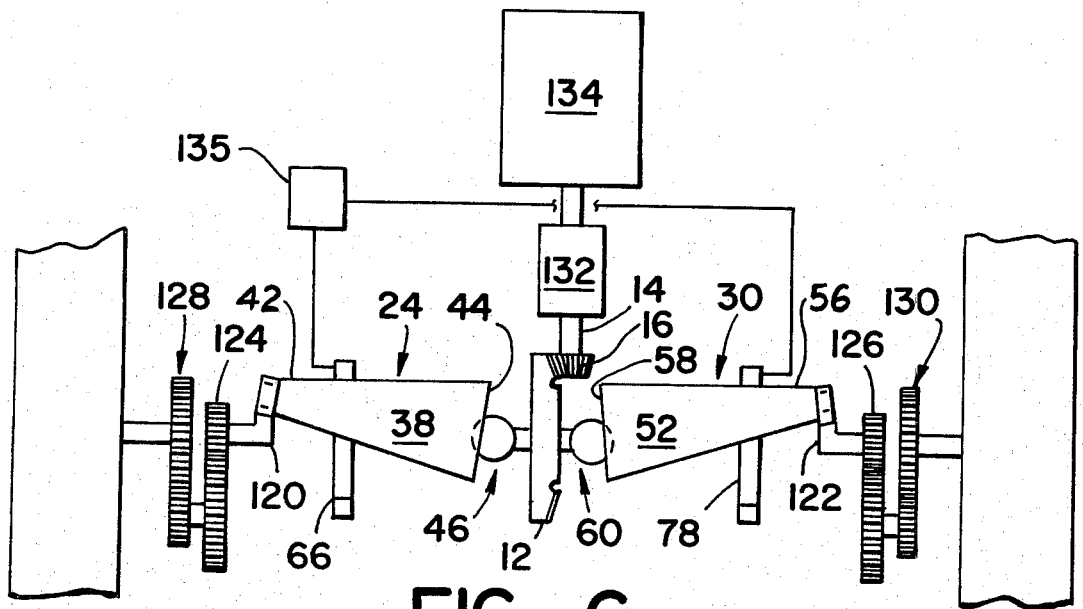
FIG_6

TRANSMISSION-DIFFERENTIAL COMBINATION

BACKGROUND OF THE INVENTION

1. Field of the Invention

The invention relates to a combination transmission-differential arrangement having power input at a point between two friction type transmissions with the drive ratios at each transmission being adjustable so that minimum wheel or track slippage occurs.

2. Prior Art

There are any number of single ended friction drive transmissions available. However, double ended friction drive transmissions driven by a functionally central drive wheel are not known and the use of such transmissions along with only individual differentials for both of the friction drive transmissions is likewise not known. Thus it is not known to adjust the drive ratios at such transmissions to arrange for minimum slippage at the wheels or tracks of a vehicle. Accordingly a problem of slippage does exist when a vehicle is turning and the transmission transmitting power to each wheel or track thereof is supplying the same torque at the same speed. Declutching of friction drive transmissions is theoretically practical and could be utilized to simply declutch the transmission on one side of a vehicle during turning. This could be done for example by having a valve which activates as the steering wheel of the vehicle is moved a significant amount. However, this could lead to a waste of power and somewhat uneven motion of the vehicle. Hence, declutching alone is not a solution to the above mentioned slipping problem.

SUMMARY OF THE INVENTION

The present invention is directed to overcoming one or more of the problems as set forth above.

In accordance with the present invention there is provided a transmission-differential combination which has a steering capability. The combination comprises a drive wheel along with means for imparting rotary motion to the drive wheel. A first output shaft is spaced from the drive wheel. A first transmission delivers rotary motion from the drive wheel to drive the first output shaft. Means is provided for selectively varying the drive ratio of the first transmission. A second output shaft is also spaced from the drive wheel. A second transmission delivers rotary motion from the drive wheel to drive the second output shaft. Also, means are provided for selectively varying the drive ratio of the second transmission.

BRIEF DESCRIPTION OF THE DRAWINGS

The invention will be better understood by reference to the figures of the drawings wherein like numbers denote like parts throughout and wherein:

FIG. 1 illustrates one embodiment of a friction drive-differential combination in accordance with the present invention;

FIG. 2 illustrates schematically means for selectively mechanically varying the drive ratios of the transmission shown in FIG. 1 responsive to steering wheel movement;

FIG. 3 illustrates schematically means for selectively hydraulically varying the drive ratios of the transmissions of FIG. 1 responsive to steering wheel movement;

FIG. 4 illustrates schematically a combination as in FIG. 1 including means for selectively declutching a respective one of the transmissions illustrated in FIG. 1;

FIG. 5a illustrates schematically a lever operated hydraulic system similar to the system of FIG. 3;

FIG. 5b illustrates schematically a lever operated mechanical system which functions similarly to the system of FIG. 2;

FIG. 6 illustrates a first alternate embodiment of a friction drive-differential combination in accordance with the present invention; and FIG. 7 illustrates a second embodiment of a friction drive-differential combination in accordance with the present invention.

DETAILED DESCRIPTION OF THE PREFERRED EMBODIMENTS

Adverting to FIG. 1, there is illustrated therein an overall transmission-differential combination 10 which has a steering capability. The combination includes a central drive wheel 12 along with means for imparting rotary motion thereto. The particular rotary motion imparting means illustrated in FIG. 1 comprises a drive shaft 14 driven by a prime mover (not shown) and having a bevel gear pinion 16 at an end thereof. The bevel gear pinion 16 meshingly engages with the drive wheel 12 via bevel gear teeth 18. A first output shaft 20 is provided which is coaxial with the drive wheel 12 and spaced from a first side 22 thereof. Intermediate the first side 22 of the drive wheel 12 and the first output shaft 20 is a first mechanical transmission 24 which will be described in greater detail below. Basically, the first transmission 24 serves to deliver rotary motion from the drive wheel 12 to the first output shaft 20. A second output shaft 26 is provided which is coaxial with the drive wheel 12 and spaced from a second side 28 thereof. A second mechanical transmission 30 serves to deliver rotary motion from the drive wheel 12 to the second output shaft 26. As will become more apparent from the description which follows, the invention is equally useful with non-coaxial output shafts, with a drive wheel which is non-central and with output shafts which do not necessarily proceed from opposite sides of the drive wheel.

In the embodiment illustrated in FIG. 1, the drive wheel 12 includes a first bearing 32 located at the first side 22 thereof and spaced from an axis 34 thereof. Similarly, the drive wheel 12 includes a second bearing 36 at the second side 28 thereof with the second bearing 36 likewise being spaced from the axis 34. The first transmission 24 then comprises a first conically surfaced roller 38, generally of a truncated conical shape, which first conically surfaced roller 38 has a short shaft 40 extending from an apex end 42 thereof to rotatingly fit in the first bearing 32. A base end 44 of the first conically surfaced roller 38 has a conventional universal or constant velocity joint means 46 which is shown only schematically and which drivingly engages the first output shaft 20. In the particular embodiment illustrated the constant velocity means 46 comprises a spherical seat 48 at the base end 44 of the first conically surface roller 38 and a mating ball 50 at an end of the first output shaft 20. The second transmission 30 can similarly include a second conically surfaced roller 52 having a short shaft 54 at an apex end 56 and further having a base end 58 having universal joint constant velocity means 60 comprising a spherical seat 62 in the apex end 56 of the second conical roller 52 and a ball 64 at an end of the second output shaft 26. It should be understood that the particular universal joint means shown can be replaced by any of a number of other conventional universal joint means with no significant change in performance.

The first transmission 24 further includes a first ring 66 keyed or splined for axial movement at 68 to a case 70 which surrounds said first transmission 24. The first ring 66 has an infacing friction surface 72 which fits about the first roller 38 coaxially with the drive wheel 12 and the first roller 38 nutates within the first ring 66 in contact with the friction surface 72. The drive ratio of the first transmission 24 is varied by moving the first ring 66 axially within the case 70 in a convenient and controllable manner. For example, means for selectively axially adjusting the position of the first ring 66 relative to the case 70 and hence also relative to the first roller 38 can comprise a hydraulic motor 74 which is connected to the first ring 66 by appropriate mechanical connection means indicated schematically at 76. Similarly, the second transmission 30 includes a second ring 78 keyed or splined as at 80 to the case 70 for axial movement relative to the case 70 and hence relative to the second roller 52. The second ring 78 has a friction surface 82 against which the second roller 52 nutates within the second ring 78. A second hydraulic motor 84 along with mechanical connection means indicated schematically at 86 provide means for selectively axially adjusting the position of the second ring 78 relative to the second roller 52.

It should be particularly noted that the hydraulic motors 74 and 84 can be replaced by any number of mechanical linking means. For example, direct mechanical linkage from a steering wheel 88 seen in FIG. 2 can cause movement of the first ring 66 and the second ring 78 (via pinion 90, rack 92, link 94, pinion 96, rack 98, tie rod 100 and linkage means 102). Alternatively, as seen in FIG. 3, turning of the steering wheel 88 can lead to control of hydraulic fluid from a pump 104 to a proper end or ends of a single hydraulic motor 106 which can advantageously replace the two hydraulic motors 74 and 84 in many configurations. The use of the single hydraulic motor 106 leads to simultaneous setting of the drive ratios of the first transmission 24 and the second transmission 30 whereby the transmission-differential combination 10 drives a pair of generally parallel ground engaging means 108 of a vehicle 110 to provide higher speed and lower torque to a first of the ground engaging means 108 and lower speed and higher torque (on a reasonably high friction surface) to a second of the ground engaging means 108, namely that one which moves a lesser distance. Such speed and torque adjustment is a feature of each embodiment of the invention.

Referring now to FIG. 4 there is indicated an embodiment in accordance with FIG. 1 wherein clutch means 112 is provided for clutching and declutching the first transmission 24 from a reduction gear 113 and identical operating second clutch means 112 is provided for clutching and declutching the second transmission 30.

FIG. 5a illustrates a modification on the control system shown in FIG. 3 wherein instead of using a steering wheel 88 to control the hydraulic motor 106, the motor is instead controlled by lever means 114 whereby a steering wheel is not needed on the vehicle. The lever means 114 is operated to provide little or no slipping of the ground engaging means 108 of the vehicle 110.

FIG. 5b illustrates a modification of the control system shown in FIG. 2. Instead of using a steering wheel 88 to control the linkage 102 and thereby the rings 66 and 78, an alternate linkage 116 is controlled by movement of a lever 118 to move these same rings.

FIRST ALTERNATE EMBODIMENT

Referring to FIG. 6, there is illustrated an embodiment of the invention wherein the first and second transmissions 24 and 30 are constructed to provide speed reduction. In this embodiment the drive wheel 12' at its center, universally supports the loose ends 44 and 58 of the rollers 38 and 52 are constant velocity joint means 46 and 60. The apex ends 42 and 56 turn cranks 120 and 122 which rotate gears 124 and 126 which then motivate final drives 128 and 130. In this embodiment a simple conventional transmission 132 can be positioned between a vehicle engine 134 and the drive shaft 14. The transmission 132 can, for example, give a choice of 2:1 speed increase, 1:1 straight through or 1:2 speed reduction. Reduction from the bevel gear pinion 16 to the drive wheel 12 in such an embodiment is generally minimal and, indeed, is unnecessary. The positions of the rings 66 and 68 is as previously described for other embodiments and is indicated schematically by a control device 135 as linked to steering means.

SECOND ALTERNATE EMBODIMENT

FIG. 7 shows an embodiment which utilizes a far different type of friction drive transmissions. In this embodiment a drive wheel 136 is driven directly by the attached drive shaft 14. A first friction transmission 24' and a second friction transmission 30' are each driven by frictional contact with the drive wheel 136. The first friction transmission 24' comprises a first driven wheel 138 having a contact area 140 thereof in frictional engagement with a first portion 142 of an edge of the drive wheel 136. The first driven wheel 138 rotates a first output shaft 144 which is held in a first bearing 146. The first bearing 146 is movable through action of a first hydraulic motor 148 as controlled by a first valve 150 which directs flow from a pump 152 and to a sump 154. Similarly, the second friction transmission 30' comprises a second drive wheel 156 having a contact area 158 in engagement with a second portion 160 of the edge of the drive wheel 136. The second driven wheel 156 rotates a second output shaft 162 which is held in a second bearing 164. The second bearing 164 moves through action of a second hydraulic motor 166 as controlled by a second valve 168. It is clear that similarly to the embodiment of FIG. 3 a single hydraulic motor can advantageously replace the motors 148 and 166 or that mechanical linkages may be used in place of hydraulic operation.

As the respective output shafts 144 and 162 are moved the effective radial distance between each of these shafts and the first and second edge portions 142 and 160 are varied thus varying the speed of said output shafts. With the output shafts 144 and 162 in the positions shown in FIG. 7 (both below the drive wheel 136), said output shafts will rotate in opposite directions. When one of the output shafts 144 and 162 is above the drive wheel 136 and the other is below said drive wheel (under the impetus of the motors 148 and 166), said output shafts will rotate in the same direction. Thus it is possible to independently selectively obtain forward or reverse operation of the output shafts 144 and 162 at the same or different speeds and hence to obtain forward or reverse operation of a vehicle having such a transmission, at selectable speeds, as well as turning of the vehicle while it is going forward or in reverse. It should be noted that the output shafts 144 and 162 will often not be coaxial in this embodiment. It should also be noted that, although the output shafts 144 and 162 are illustrated as proceeding from 180° spaced first and second edge portions 142 and 160, the output shafts 144 and 162 can proceed from edge portions 142 and 160 which are spaced at less than 180°, so long as the first and second driven wheels 138 and 156 do not interferingly engage with one another.

It is contemplated as being within the scope of the present invention to use other frictional mechanical transmissions as well.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A transmission-differential combination having a steering capability, comprising:
    a drive wheel;
    means for imparting rotary motion to said drive wheel;
    a first output shaft spaced from said drive wheel;
    a first transmission delivering rotary motion from said drive wheel to drive said first output shaft;
    means for selectively varying the drive ratio of said first transmission;
    a second output shaft spaced from said drive wheel;
    a second transmission delivering rotary motion from said drive wheel to drive said second output shaft; and
    means for selectively varying the drive ratio of said second transmission,
    both of said drive ratio selective varying means providing infinite drive ratio variation within a selected range,
    said first and second transmissions including frictional mechanical transmissions,
    said combination driving a pair of generally parallel ground engaging means of a vehicle, and including means for simultaneously setting said first and second transmission drive ratios varying means to provide higher speed to a first of said ground engaging means which moves a greater distance and lower speed to a second of said ground engaging means which moves a lesser distance,
    said drive wheel including first bearing means at the first side thereof spaced from an axis thereof and second bearing means at the second side thereof spaced from said axis thereof;
    said first transmission including a first generally conically surface roller having a shaft extending from an apex end thereof to rotatingly fit in said first bearing means and a base end thereof having universal joint means drivingly connected to said first output shaft;
    said first transmission selective drive ratio varying means including a first ring having an infacing friction surface fitting about said first roller coaxially with said drive wheel, said first roller nutating within said first ring in contact with said friction surface; and means for selectively axially adjusting the position of said first ring relative to said first roller;
    said second transmission including a second generally conically surfaced roller having a shaft extending from an apex end thereof to rotatingly fit in said second bearing means and a base end thereof having universal joint means drivingly connected to said second output shaft; and
    said second transmission selective drive ratio varying means including a second ring having an infacing friction surface fitting about said second roller coaxially with said drive wheel, said second roller nutating within said second ring in contact with said friction surface; and means for selectively axially adjusting the position of said second ring relative to said second roller.

2. A combination as in claim 1, wherein said means for imparting rotary motion to said drive wheel comprises gear means meshed with a periphery of said drive wheel.

3. A transmission-differential combination having a steering capability, comprising:
    a drive wheel;
    means for imparting rotary motion to said drive wheel;
    a first output shaft spaced from said drive wheel;
    a first transmission delivering rotary motion from said drive wheel to drive said first output shaft;
    means for selectively varying the drive ratio of said first transmission;
    a second output shaft spaced from said drive wheel;
    a second transmission delivering rotary motion from said drive wheel to drive said second output shaft; and
    means for selectively varying the drive ratio of said second transmission,
    both of said drive ratio selective varying means providing infinite drive ratio variation within a selected range,
    said combination driving a pair of generally parallel ground engaging means of a vehicle, and including means simultaneously setting said first and second transmission drive ratios varying means responsive to any degree of turning of said ground engaging means to provide higher speed to a first of said ground engaging means which moves a greater distance and lower speed to a second of said ground engaging means which moves a lesser distance;
    said drive wheel including first bearing means at the first side thereof spaced from an axis thereof and second bearing means at the second side thereof spaced from an axis thereof;
    said first transmission including a first generally conically surfaced roller having a shaft extending from an apex end thereof to rotatingly fit in said first bearing means and a base end thereof having universal joint means drivingly connected to said first output shaft;
    said first transmission selective drive ratio varying means including a first ring having an infacing friction surface fitting about said first roller coaxially with said drive wheel, said first roller nutating within said first ring in contact with said friction surface; and means for selectively axially adjusting the position of said first ring relative to said first roller;

said second transmission including a second generally conically surfaced roller having a shaft extending from an apex end thereof to rotatingly fit in said second bearing means and a base end thereof having universal joint means drivingly connected to said second output shaft; and said second transmission selective drive ratio varying means including a second ring having an infacing friction surface fitting about said second roller coaxially with said drive wheel, said second roller nutating within said second ring in contact with said friction surface; and means for selectively axially adjusting the position of said second ring relative to said second roller.

4. A transmission-differential combination having a steering capability, comprising:
a drive wheel;
means for imparting rotary motion to said drive wheel;
a first output shaft spaced from said drive wheel;
a first transmission delivering rotary motion from said drive wheel to drive said first output shaft;
means for selectively varying the drive ratio of said first transmission;
a second output shaft spaced from said drive wheel;
a second transmission delivering rotary motion from said drive wheel to drive said second output shaft; and
means for selectively varying the drive ratio of said second transmission,
said first transmission including a first driven wheel having a first output shaft extending axially therefrom, a lateral surface of said first driven wheel frictionally engaging a first peripheral portion of said drive wheel;
said second transmission including a second driven wheel having a second output shaft extending axially therefrom, a lateral surface of said second driven wheel frictionally engaging a second peripheral portion of said drive wheel;
means for selectively moving said first driven wheel parallel to the rotational axis of said drive wheel to thereby adjust the speed of said first output shaft; and
means for selectively moving said second driven wheel parallel to the axis of said drive wheel to thereby adjust the speed of said second output shaft.

5. A combination as in claim 4, wherein said first driven wheel selective moving means is movable sufficiently far to reverse the direction of rotation of said first output shaft and said second driven wheel selective moving means is movable sufficiently far to reverse the direction of rotation of said second output shaft.

6. In a power train having input means for delivering power input and first and second generally oppositely-facing output shafts, the improvement comprising means for receiving power from the input means and delivering it to the output shafts while providing both differential and transmission functions, said means including:
a first conical element having a driving connection to the first output shaft;
a second conical element having a driving connection to the second output shaft;
a drive member driven by the input means and having means for driving the conical elements in a nutating path;
first and second contact members respectively engaged with the first and second conical elements to cause the conical elements to rotate as they nutate; and
means for selectively and independently changing the location of each contact member relative to the axis of the respective conical element to change its point of engagement with the respective conical element to vary the speed of the corresponding output shaft.

7. A transmission and differential comprising:
a rotatable input means adapted to be connected to a prime mover for rotation about a first axis; and
a variable speed nutating transmission means having a pair of independently rotatable outputs and an input connected to said input means for rotation about a second axis, said transmission means further including a pair of nutating elements each having a surface configuration defined by a non-cylindrical surface of revolution having an axis of revolution, means mounting each of said elements for rotation about a third axis coincident with said axis of revolution, said mounting means being mounted for rotation about an axis different than said third axis, a pair of drive units, one for each nutating element, in frictional engagement with the surface of revolution of the associated nutating element, means for selectively and independently moving each of said drive units along the associated surface of revolution while maintaining frictional engagement therewith, means connecting said mounting means to one of said transmission means input and a corresponding one of said transmission means outputs, and means connecting said drive units to the other of said mounting means and a corresponding one of said transmission means outputs;
whereby (a) variable speeds may be obtained by moving both said drive units in concert along their respective surfaces of revolution, and (b) differential speeds may be obtained by moving one or the other or both of said drive units differentially along their respective surfaces of revolution.

8. The invention of claim 7 wherein said third axis for said nutating elements are non-co-axial with each other.

9. The transmission and differential of claim 7 further including a multiple speed, fixed ratio transmission having an output connected to said input means.

10. A vehicle including the transmission and differential of claim 7 and further including a prime mover connected to said input means and driven ground engaging means connected to each of said transmission means outputs to be driven thereby and a steering control means for said vehicle and connected to both said moving means for said drive units to move the same differentially to thereby cause said transmission means outputs to rotate at different speeds and thereby cause the associated ground engaging means to be driven at different speeds to effect a turn of the vehicle.

11. The vehicle of claim 10 wherein said vehicle further includes additional, shiftable ground engaging means operable by said steering control means.

* * * * *